Patented Mar. 19, 1940

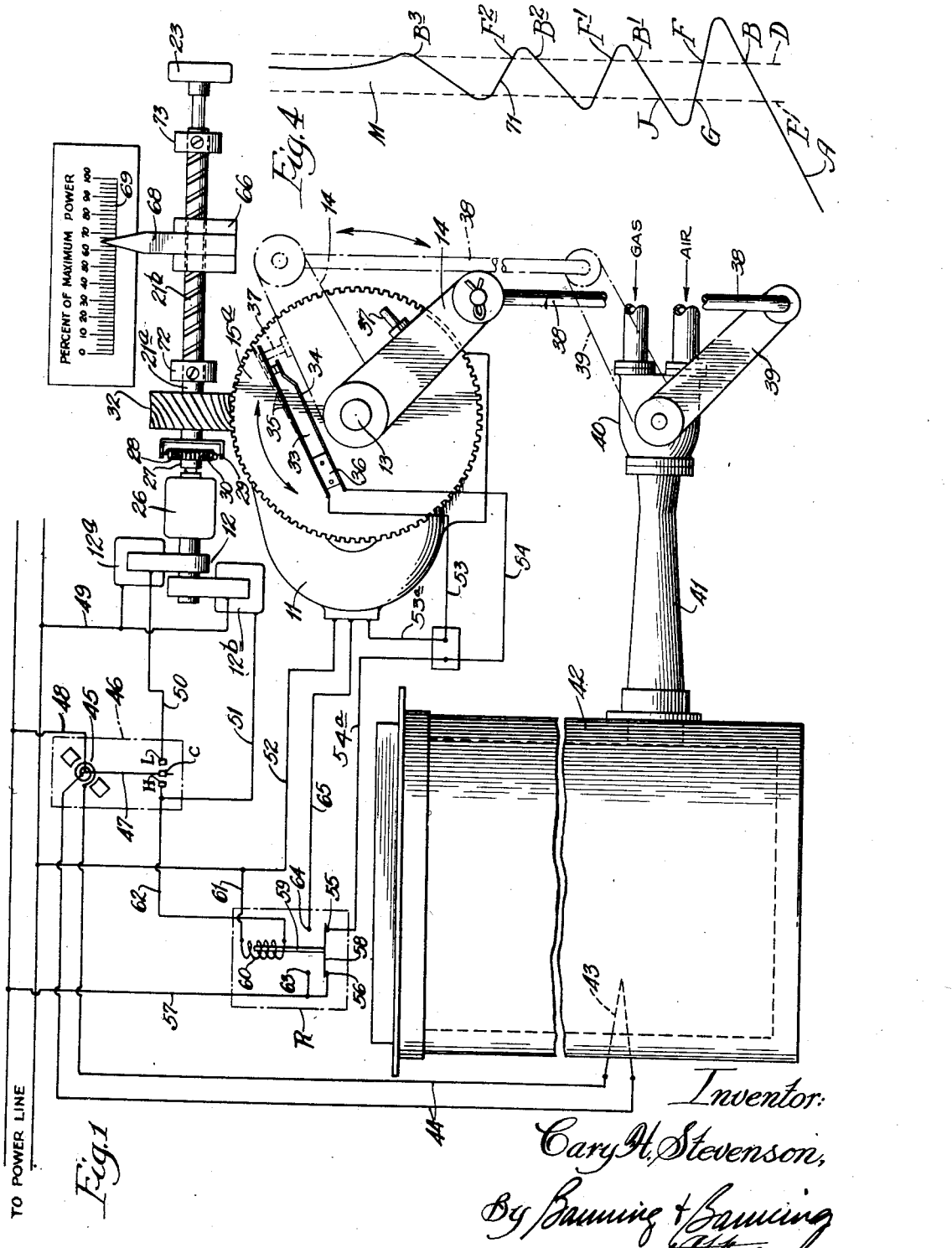

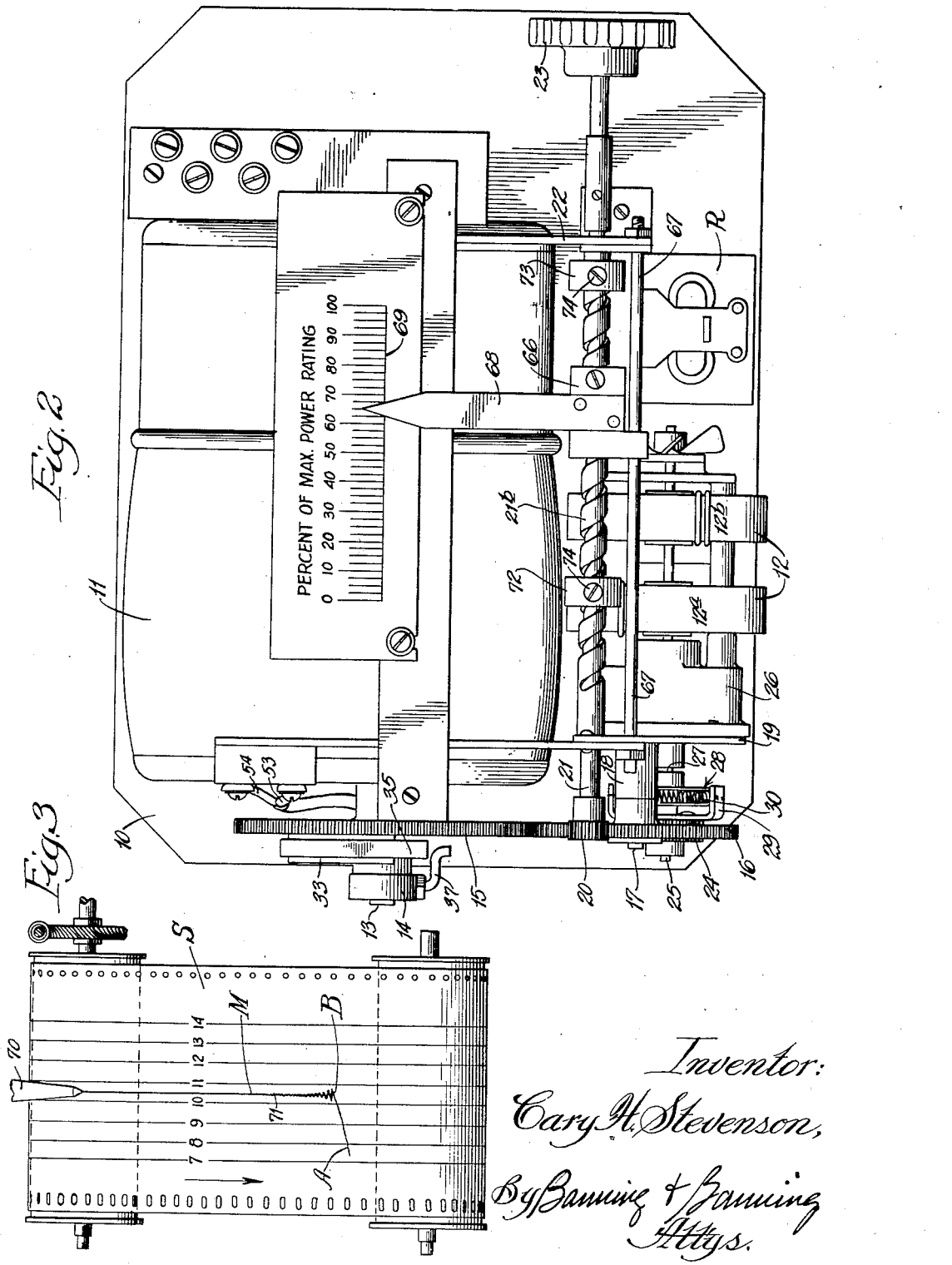

2,193,845

UNITED STATES PATENT OFFICE 2,193,845

AUTOMATIC CONTROL

Cary H. Stevenson, Chicago, Ill., assignor to Lindberg Engineering Company, Chicago, Ill., a corporation of Illinois Application August 22, 1936, Serial No. 97,444

10 Claims. (Cl. 236—15)

An object of this invention is to provide means for automatically controlling a piece of apparatus as a valve, or rheostat, in order to maintain, within narrow limits, a chemical or physical condition such as temperature, acidity, moisture content, etc., in a given zone.

Another object is to provide means for automatically manipulating said piece of apparatus as a valve so that as it approaches a position where the desired condition is to be maintained, said valve or the like will be moved progressively less and less until said piece of apparatus may remain stationary or nearly so for considerable periods to maintain the desired condition.

Applied to a specific purpose, as, for example, a gas-fired furnace, it is an object to provide means for automatically causing a valve to reach and maintain a position where it will just hold the desired temperature in the furnace substantially without further movement of the valve.

These and other objects, as will hereinafter appear, are accomplished by this invention which is fully described in the following specification and shown in the accompanying drawings, in which:

Figure 1 is a schematic view of the control apparatus, including a diagram of electrical connections, illustrated in connection with a gas-fired furnace by way of example;

Fig. 2 is a top plan view of a control apparatus embodying the invention;

Fig. 3 is a front elevation of a record strip showing a record as produced by a recording pyrometer on a furnace controlled by this apparatus; and Fig. 4 is a view of the first part of the graph of Fig. 3 greatly magnified.

The embodiment as illustrated in Fig. 2 comprises a base 10 on which is mounted a reversible valve operating motor 11 and a reversible adjusting motor 12. The valve motor 11 has a built-in gear reduction driving a shaft 13 on which is keyed a lever arm 14. An idler gear 15 is rotatably mounted on the shaft 13 back of the lever arm 14 and meshes with an idler gear for rotation of a stub shaft 17 carried by the boss 18 on the upright 19 which is secured in any desired manner to the base 10. The gear 16 meshes with a pinion 20 which is keyed on an adjusting shaft 21. This shaft which runs substantially the length of the apparatus is journaled in uprights 19 and 22 and is provided at the right hand end with an adjusting knob 23.

The reversible motor 12 operates through a gear reduction 26 to drive a shaft 25 on which is keyed a member 27 of a friction clutch 28 which in turn drives a gear 24 journaled on the shaft 25. This clutch has a yoke 29 secured to the gear 24 and carrying two springs 30 each of which occupies about 180° in a grooved rim of the member 27. The friction is sufficient to drive through the clutch under all ordinary operating conditions, but will permit slippage in case some of the parts reach the end of their movement, as will later be described.

The wiring diagram of Fig. 1 while similar in operation to the construction of Fig. 2 differs therefrom in certain details for the sake of simplicity and ease of illustration. Thus the adjusting motor 12 drives from the gear reduction 26 through the clutch 28 directly to the shaft 21ª and from this through a worm 32 to a worm wheel 15ª which corresponds to the gear 15 of Fig. 2.

The gear 15ª carries a high-limit switch 33 which has contact fingers 34, 35, the latter overhanging the former to provide an operating end as will presently be described. These fingers are mounted upon an insulating block 36 which is secured to the side of the gear 15ª. The upper of these fingers, which are normally in contact, is raised as shown in dotted lines by means of a plunger 37 carried by the lever arm 14 so that as the lever arm approaches the limit switch as shown in dotted lines, the plunger contacts the finger 35, thereby opening the switch for a purpose to be described later.

If the present control apparatus be employed with a gas-fired furnace by way of example, the lever arm 14 connects through a link 38 to a valve lever 39 on a valve 40 which controls the amount of combustible mixture of gas and air passing through a burner 41 to a heat treating furnace or the like 42 where it is desired that a given temperature shall be maintained substantially constant. The lower limit of the swing of lever 14 is controlled by a low-limit switch not shown but located in the motor 11. In order to maintain the temperature of this furnace constant it is provided with a pyrometer 43 which connects through leads 44 with a galvanometer or the like 45. This galvanometer, through means not shown but which are well understood in the art, forms part of a pyrometer control 46 which has adjustable electric contacts H and L and a movable contact C adapted to make connection with either of the contacts H or L. Contact C is carried on a swinging arm 47 which connects through a lead 48 with one side of a power line.

The reversing motor 12 may consist of two motors 12ᵃ and 12ᵇ, one being adapted to run in one direction, the other in the reverse direction. A lead 49 is common to both windings of the motor 12 and is connected to one side of the power line. A lead 50 connects the other side of one of the windings to the pyrometer control contact L, while a lead 51 connects the other side of the other winding to the control contact H.

Thus it will be seen that as the contact C swings to the right it will engage the contact L thereby driving the shaft 21ᵃ in a direction which tends to revolve the gear 15ᵃ in a counter-clockwise direction. As the contact C engages the contact H, the shaft 21ᵃ and gear 15ᵃ will be driven in the opposite direction.

The reversing motor 11 has three leads, 52, 53 and 65. The lead 52 is common to the two windings (not shown) of this motor and connects to one side of the power line. One side of one of the motor windings connects through a lead 53ᵃ and a flexible lead 53 with the finger 35 of the limit switch. The other finger 34 connects through a flexible lead 54 and a lead 54ᵃ with a relay contact 55 of the relay R while a contact 56 connects through a lead 57 to the other side of the power line. The contacts 55 and 56 are normally closed by means of an armature 58 which is carried by a core 59 which is operative by a coil 60. This coil connects at one end through a lead 61 to the valve motor lead 52, the other end of the coil connecting through a lead 62 to the pyrometer control contact H. A relay contact 63 is connected to the lead 57 and a contact 64 connects through a lead 65 to the opposite or reversing side of the valve motor.

Thus as the contact C engages the pyrometer control H, the relay 60 becomes energized, thereby opening the circuit across the contacts 55, 56 and closing the circuit across the contacts 63, 64, thereby driving the valve lever 14 in the clockwise direction, closing the valve 40.

The shaft 21ᵃ has a centrally threaded portion 21ᵇ on which is screwed a block 66 which is prevented from rotating by means of a longitudinal guide 67 (Fig. 2). The block carries a pointer 68 which operates over a scale 69 which is preferably graduated in the percentage of opening of the valve 40.

Thus it will be seen that as the shaft 21ᵃ rotates, the gear 15ᵃ is likewise rotated and the pointer 68 moves over the scale proportionally so that the pointer at all times indicates the heating rate set by the limit switch. The operator can readily shift the gear 15ᵃ with its limit switch forward or backward at will by means of the knob 23, the position of the plunger permitting, the friction clutch 28 allowing slippage as this knob is turned. The limit switch and its gear 15ᵃ can be moved in a clockwise direction only when the lever arm 14 is moved so as to permit this movement. Otherwise, the plunger 37 prevents the movement of the finger 35 in this direction. It will be apparent that the limit switch could be mounted on the block 66, if desired, instead of on the gear 15 or 15ᵃ, in which case an operating member would be operably connected to the valve lever arm to open this limit switch as the plunger 37 does in the embodiment shown.

Contacts H and L are adjusted so as to give a predetermined temperature range, and are also adjusted with respect to each other to vary the width of that range. This is well known and forms no part of the present invention.

A record sheet S (Fig. 3) is suitably mounted to feed slowly downward at a constant rate beneath an inking stylus 70 which is connected in any desired manner, not shown but which is well understood in the art, to the pyrometer so that the position of the inking stylus at any given instant shows the temperature of the thermocouple of the pyrometer. The graph 71 of Fig. 3 is a characteristic one obtained with the apparatus described herein.

The operation of this device, when applied to a furnace as described, is as follows:

Starting with the valve closed and with the heat in the furnace 42 considerably below normal, as indicated by the point A on the graph, the contact C is in engagement with the contact L causing the valve motor 11 to move the lever arm 14 to the maximum open position permitted by the limit switch 33.

Thus with the valve 40 wide open and the limit switch set at maximum open position, the limit switch cannot move either way. The temperature in the furnace then climbs rapidly as indicated by the graph until it reaches the point B on the line D at which time the temperature in the furnace causes the thermocouple 43 to actuate the galvanometer which brings the contact C into engagement with the contact H with the result that the coil 60 is energized causing the relay armature 58 to engage the contacts 63, 64 causing current from the line to flow to motor 11 through the leads 65 and 52. This motor thus moves the lever arm 14 in a clockwise direction to close the valve 40 as much as the setting of the low-limit switch (not shown) will permit.

At the same time the winding 12ᵇ is energized and the motor 12 moves the gear 15ᵃ and the limit switch very slowly in a clockwise direction, thereby setting the limit switch at a lower position. Motor 12 continues to operate as long as C and H are in contact. As soon, however, as C leaves H, the relay coil 60 is de-energized, closing contacts 55 and 56 through the armature 58 thus allowing the motor 11 to open the valve 40 until stopped by the limit switch 33. At the same time C leaves H, the motor 12 ceases to operate.

When C engages L of the pyrometer control, the winding 12ᵃ is energized causing the gear 15ᵃ and the limit switch to be moved in a counter-clockwise direction, releasing the limit switch 33 from the plunger 37 and allowing the motor 11 to move the arm 14 to a more open position of the valve 40. This will continue so long as C and L are in contact. The limit switch can be rotated in a counter-clockwise direction by turning the knob 23. This movement is limited by the block 66 striking the stop 73 when the clutch 28 will slip.

Referring to Fig. 4, the dotted lines D and E represent the upper and lower limits of the control zone and are the temperatures at which the contact C engages the contacts H and L, respectively, which are adjusted to correspond to said limits. With the valve 40 wide open, the heat as shown by the graph climbs rapidly to the point B on the line D when the valve motor operates to close the valve and the graph rapidly turns down. The adjusting motor 12 operates to move the gear 15ᵃ in a clockwise direction during the time the heat is above the line D, that is, until the graph reaches the point F. By that time the limit switch has been moved to a lower position corresponding to a smaller valve opening.

As the contact C leaves the contact H, the valve motor operates to open the valve as far as permitted by the limit switch. Should the temperature reach the point G, the contacts C and L close and remain closed to the point J. The adjusting motor 12 operates to move the limit switch to a position corresponding to a wider opening for the valve. The temperature then rises in the furnace but at a slower rate than before until at J the contacts C and L separate and the adjusting motor 12 which started at the point G is again stopped. If the temperature continues to climb in the furnace, it reaches the line D at the point B' at which time the motor 11 again shuts off the valve 40 while the motor 12 acts to move the limit switch in a clockwise direction, this time, however, to a less extent.

Thus it will be seen that the two motors act to move the valve toward a position as a limit where the heat supplied to the furnace will maintain its temperature within the desired narrow range represented by the zone D—E substantially without further movement of the valve for long periods. Such a condition is shown at M in Figs. 3 and 4. A graph, such as that shown, made with this apparatus has a series of zig-zag lines immediately above the point B showing clearly how the apparatus automatically adjusts itself to find the proper position of the valve to give the desired constant temperature. These swings, however, rapidly become shorter and the time between them longer until eventually the graph becomes practically a straight line.

The length of time the temperature remains above the line D is a measure of the amount of correction required, i. e., a long interval of closing indicates a great excess of heating rate, a short interval a small excess. The correction, therefore, is made in a direct relationship to the actual requirements. The same is true of the time C and L remain closed as shown by the points on the graph below the line E. Due to differences in furnace conditions, the first correction will probably not be exactly right but the corrections continue until the valve attains the correct setting to maintain the temperature at the desired point.

Stated in another way, it will be observed that the times during which these contacts are in engagement also grow less and less and consequently the times during which the motors controlled thereby are driven are decreased and the movements of the parts driven by the motors are correspondingly reduced as the control apparatus functions. Likewise the time elapsing between successive engagements of contact C with H or L increases. Thus, the time represented by B—F is larger than the B'—F' on the graph and this is larger than $B^2$—$F^2$. Also, the time interval $B^3$—$F^2$ is longer than $B^2$—F' and this is longer than B'—F.

The present embodiment of the apparatus is illustrative only. While it is shown in connection with a gas heated furnace, it will be understood that it can be used with many types of devices in which there is a control having adjustable contacts H and L and a moving contact C controlled by an existing condition in the apparatus together with some element corresponding to the valve 40 for controlling that condition.

For some purposes the operator may want to set limits for the limit switch 33 and gear $15^a$ on which it is mounted. Thus the limit switch might be set for a minimum position that would prevent the gas valve from back-firing. For this reason, I have provided an adjustable stop 12, which consists of a collar on the threaded portion $21^b$ of the threaded shaft, which is movable up and down thereon, and is secured in adjusted position by means of a screw 74. A stop 73 similarly sets an upper limit for the maximum opening of the valve 40. When the block 66 engages either of these adjustable stops, no further movement of the adjusting shaft is permitted and thus this sets maximum and minimum limits for the movement of the gear $15^a$ and the limit switch 33.

Where it is desired to operate the furnace below the minimum possible setting of the valve without back-firing, this can be done by setting the lower limit stop 72 at a point that is just above the point of back-firing for the valve 40. The adjustable contacts H and L are then set for the desired temperature, the heating rate for which may be below that for which the limit stop 72 is set. The apparatus will then operate as an on and off valve between the closed position and the setting of the limit stop. Thus the apparatus is capable of automatic use over a very wide range of temperatures.

This device has been successfully used in connection with the Brown potentiometer in which are embodied structures of the kind shown and described in patents owned by Brown Instrument Company such as Harrison Patents Nos: 1,898,124, 1,898,194, 1,927,402, and 1,946,280; and Krogh Patent No. 1,947,297. These cover particularly the pyrometer control, the temperature recorder and the like referred to herein, as well as a means for manually setting the potentiometer for the desired temperature at which the furnace is to operate. This is clearly set forth in the above patents and fixes the upper and lower limits of the "control zone" D—E of Fig. 4. This, however, is no part of the present invention.

The uses to which this invention can be put are numerous. Thus, the pyrometer control could under certain conditions be replaced by a thermostat to operate the contact C. For water level control, for example, a float could control the contact C and, acting through this apparatus, operate a water valve corresponding to the valve 40 to increase or decrease the volume of water continuously fed to a given reservoir to maintain the level therein substantially constant where the water is drained away at varying rates. In fact, many combinations may be made to operate where the operations of the control member 40 and the responsive member C are interdependent, the latter moving between predetermined limits into engagement with H or L to adjust the setting of the member 40 which in turn tends to find a position wherein the responsive contact C will lie between the contacts H and L.

While I have shown and described but a single form of this invention, it is to be understood that it is capable of many modifications. Changes, therefore, in the construction and arrangement may be made which do not depart from the spirit and scope of the invention as disclosed by the appended claims.

I claim:

1. In apparatus of the class described, a combustion chamber, a valve for supplying a combustible mixture thereto, a power circuit, a reversible motor operably connected to the valve for moving the same to control the degree of opening, a limit switch mounted to move about the axis of the motor, means carried by the motor shaft for opening the limit switch, a pyrometer control having high and low contacts, and a reversible adjusting motor adapted to be reversibly connected thereby to the power circuit, the adjusting motor being geared to the mounting of the limit switch to rotate the same about the axis of the above motor.

2. In apparatus of the class described, a combustion chamber, a valve for supplying a combustible mixture thereto, a power circuit, a reversible motor operably connected to the valve for moving the same to control the degree of opening, a limit switch mounted to move about the axis of the motor, means carried by the motor shaft for opening the limit switch, a pyrometer control having high and low contacts, a reversible adjusting motor adapted to be reversibly connected thereby to the power circuit, the adjusting motor being geared to the mounting of the limit switch to rotate the same about the axis of the valve motor, a shaft for manually rotating the limit gear, and a clutch between the gear and adjusting motor.

3. In apparatus of the class described, a combustion chamber, a valve for supplying a combustible mixture thereto, a power circuit, a reversible motor operably connected to the valve for moving the same to control the degree of opening, a limit switch mounted to move about the axis of the motor, means carried by the motor shaft for opening the limit switch, a pyrometer control having high and low contacts, a reversible adjusting motor adapted to be reversibly connected thereby to the power circuit, the adjusting motor being geared to the mounting of the limit switch to rotate the same about the axis of the valve motor, a shaft for manually rotating the limit gear, a clutch between the gear and adjusting motor, a pointer operable by the shaft, and a scale to indicate the degree of opening of the valve corresponding to the position of the pointer.

4. In apparatus of the class described, a combustion chamber, a valve for supplying a combustible mixture thereto, a power circuit, a reversible motor operably connected to the valve for moving the same to control the degree of opening, a limit switch mounted to move about the axis of the motor, means carried by the motor shaft for opening the limit switch, a pyrometer control having high and low contacts, a reversible adjusting motor adapted to be reversibly connected thereby to the power circuit, the adjusting motor being geared to the mounting of the limit switch to rotate the same about the axis of the valve motor, a shaft for manually rotating the limit gear, a clutch between the gear and adjusting motor, a pointer operable by the shaft, a scale to indicate the degree of opening of the valve corresponding to the position of the pointer, and adjustable stops for the pointer.

5. In apparatus of the class described, a combustion chamber, a valve for supplying a combustible mixture thereto, a power circuit, a reversible motor operably connected to the valve for moving the same to control the degree of opening, a limit switch mounted to move about the axis of the motor, means carried by the motor shaft for opening the limit switch, a pyrometer control having high and low contacts, and a reversible adjusting motor adapted to be reversibly connected thereby to the power circuit, the adjusting motor being geared to the mounting of the limit switch to rotate the same about the axis of the valve motor, the shaft of the valve motor rotating more rapidly than the limit switch.

6. In apparatus of the class described, a zone having a medium therein, a member for controlling the condition of that medium, a source of electric power, a reversible power motor operably connected to said controlling member, a limit switch mounted on a gear rotatable on the motor shaft and adapted to be opened and closed by an element keyed to the motor shaft, a reversible adjusting motor operably connected through an adjusting shaft to slowly drive said gear, a control having high and low contacts connected to the adjusting motor and movable by changes in the condition of the medium to cause it to engage either the high or the low contact and to thus actuate the adjusting motor to drive the gear in a corresponding direction, and a relay having reversing contacts connected to the first mentioned motor and to the source of power and operably connected to the control contacts and adapted to be actuated in one direction or the other by said control contacts to reverse the direction of movement of the first mentioned motor and the controlling member connected therewith.

7. In apparatus of the class described, a zone having a medium therein, a member for controlling the condition of that medium, a source of electric power, a reversible power motor operably connected to said controlling member, a limit switch mounted on a gear rotatable on the motor shaft and adapted to be opened and closed by an element keyed to the motor shaft, a reversible adjusting motor operably connected through an adjusting shaft to slowly drive said gear, a control having high and low contacts connected to the adjusting motor and movable by changes in the condition of the medium to cause it to engage either the high or the low contact and to thus actuate the adjusting motor to drive the gear in a corresponding direction, and a relay having reversing contacts connected to the first mentioned motor and to the source of power and operably connected to the control contacts and adapted to be actuated in one direction or the other by said control contacts to reverse the direction of movement of the first mentioned motor and the controlling member connected therewith, the movement of the element keyed to the motor shaft being relatively faster than the limit switch in both directions.

8. In apparatus of the class described, a zone having a medium therein, a member for controlling the condition of that medium, a source of electric power, a reversible power motor operably connected to said controlling member, a limit switch mounted on a gear rotatable on the motor shaft and adapted to be opened and closed by an element keyed to the motor shaft, a reversible adjusting motor operably connected through an adjusting shaft to slowly drive said gear, a control having high and low contacts connected to the adjusting motor and movable by changes in the condition of the medium to cause it to engage either the high or the low contact and to thus actuate the adjusting motor to drive the gear in a corresponding direction, and a relay having reversing contacts connected to the first mentioned motor and to the source of power and operably connected to the control contacts and adapted to be actuated in one direction or the other by said control contacts to reverse the direction of movement of the first mentioned motor and the controlling member connected therewith, means operably connected to the gear to indicate the position of the limit switch, and adjustable stops for said indicating means.

9. In apparatus of the class described, a zone having a medium therein, a member for controlling a condition of that medium, a source of electric power and a reversing switch operably connected to said member, a reversible power motor operably connected to said switch, a limit switch mounted on a gear rotatable on a shaft driven by the power motor and operable by an element keyed to said shaft, a reversible adjusting motor operably connected through an adjusting shaft to slowly drive said gear, a control having high and low contacts connected to the adjusting motor, a central contact connected to the power source and movable by changes in the condition of the medium to cause it to engage either the high or the low contact to drive the gear in one direction or the other, and a relay having reversing contacts connected to the valve motor and to the source of power and operably connected to the control contacts to operate to reverse the power motor when one of the control contacts is energized.

10. Apparatus for automatically controlling the temperature within a chamber whose temperature is affected by the greater or smaller rate of flow of a temperature influencing medium including a member for controlling the rate of flow of that medium, a reversible electric motor for moving said member in either direction to alter the rate of flow of the medium to maintain the temperature of the chamber within a predetermined range, a limit switch for stopping the movement of the motor in one direction, means responsive to an excess or deficiency of temperature in the chamber above or below the predetermined range for reversing the motor, a reversible adjusting electric motor responsive to an excess or deficiency of temperature in the chamber above or below the predetermined range, and said motor having a driving connection with the limit switch for adjusting the position of said switch independently of said member for operation thereby.

CARY H. STEVENSON.